(12) United States Patent
Guanwardana et al.

(10) Patent No.: US 8,892,498 B2
(45) Date of Patent: Nov. 18, 2014

(54) FORECASTING A FUTURE EVENT IN AN EVENT STREAM

(75) Inventors: Asela Jeevaka Ranaweera Guanwardana, Seattle, WA (US); Christopher A. Meek, Kirkland, WA (US); Ankur P. Parikh, Pittsburgh, PA (US)

(73) Assignee: Microsoft Corporation, Redmond, WA (US)

( * ) Notice: Subject to any disclaimer, the term of this patent is extended or adjusted under 35 U.S.C. 154(b) by 13 days.

(21) Appl. No.: 13/433,289

(22) Filed: Mar. 29, 2012

(65) Prior Publication Data
US 2013/0262369 A1    Oct. 3, 2013

(51) Int. Cl.
*G06N 5/00*    (2006.01)
*G06F 1/00*    (2006.01)

(52) U.S. Cl.
USPC .............................. 706/55; 718/101; 700/273

(58) Field of Classification Search
USPC .......................................................... 706/55
See application file for complete search history.

(56) References Cited

U.S. PATENT DOCUMENTS

| | | | |
|---|---|---|---|
| 4,935,882 A * | 6/1990 | Pennebaker et al. .......... | 702/181 |
| 5,889,993 A | 3/1999 | Kroeger et al. | |
| 7,251,589 B1 | 7/2007 | Crowe et al. | |
| 2003/0014292 A1 | 1/2003 | Strubbe et al. | |
| 2003/0041042 A1 | 2/2003 | Cohen et al. | |
| 2003/0055759 A1 | 3/2003 | Conkwright et al. | |
| 2005/0228763 A1 | 10/2005 | Lewis et al. | |
| 2006/0242001 A1 | 10/2006 | Heathfield | |
| 2007/0094219 A1 * | 4/2007 | Kipersztok .................... | 706/52 |
| 2010/0250310 A1 * | 9/2010 | Locherer ......................... | 705/7 |
| 2011/0071964 A1 | 3/2011 | Horvitz | |

OTHER PUBLICATIONS

Liu, et al., "Spatial-Temporal Event Prediction: A New Model", Retrieved at <<http://ieeexplore.ieee.org/stamp/stamp.jsp?tp=&arnumber=725109>>, Oct. 11-14, 1998, pp. 2933-2937.
Amodeo, et al., "Hybrid Models for Future Event Prediction", Retrieved at <<research.yahoo.com/files/pp793-amodeo.pdf>> CIKM 2011, Oct. 24-28, 2011, pp. 1981-1984.
Laxman, et al., "Stream Prediction Using a Generative Model Based on Frequent Episodes in Event Sequences", Retrieved at <<http://research.microsoft.com/pubs/71393/predicting-target-events-kdd08.pdf>> KDD, ACM, 2008, Aug. 24-27, 2008, pp. 453-461.

(Continued)

*Primary Examiner* — Jeffrey A Gaffin
*Assistant Examiner* — Kalpana Bharadwaj
(74) *Attorney, Agent, or Firm* — David Andrews; Sandy Swain; Micky Minhas (57) ABSTRACT

Methods and systems for forecasting a future event in an event stream are provided herein. The event stream includes a number of events, wherein each of the events includes an event label and an associated time stamp. The system includes a processor that is adapted to execute stored instructions and a system memory. The system memory includes code configured to generate one or more decision graphs for predicting events with event labels chosen from a number of event labels based on the events within the event stream, wherein the decision graph includes decision nodes and leaf nodes, and wherein each of the decision nodes includes a question. The system memory also includes code configured to analyze event stream data using the decision graph and forecast a future event in the event stream based on the analysis of the event stream data.

17 Claims, 8 Drawing Sheets

(56) References Cited

OTHER PUBLICATIONS

Brown, et al., "Multiple neural spike train data analysis: state-of-the-art and future challenges", Retrieved at <<http://www.stat.cmu.edu/~kass/papers/bkm.pdf>> May 2004, vol. 7, No. 5, pp. 456-461.

Buntine. Wray, "Theory refinement on Bayesian networks", Retrieved at <<http://uai.sis.pitt.edu/papers/91/p52-buntine.pdf>> 1991, pp. 52-60.

Daley, et al., "An Introduction to the Theory of Point Processes: Elementary Theory and Methods", Retrieved at <<http://sistemas.fciencias.unam.mx/~silo/Cursos/ProcesosEst22011-2/Daley.pdf>> vol. I. Springer, 2 edition, 2003, pp. 490.

Dean, et al., "Probabilistic temporal reasoning", Retrieved at <<http://www.aaai.org/Papers/AAAI/1988/AAAI88-093.pdf>> 1988, pp. 524-528.

Didelez, Vanessa, "Graphical models for marked point processes based on local independence", Retrieved at <<http://www.stats.bris.ac.uk/~maxvd/mpp_as_published.pdf>> 2008, 70(1), pp. 245-264.

Friedman, et al., "Using Bayesian networks to analyze expression data", Retrieved at <<http://www.ls.huji.ac.il/michall/papers/Friedman-JBC-paper.pdf>> 2000, vol. 7, No. 3/4, pp. 601-620.

Friedman, et al., "Learning the structure of dynamic probabilistic networks", Retrieved at <<http://www.cs.huji.ac.il/~nir/Papers/FMR1.pdf>> 1998, pp. 9.

Gunawardana, et al., "A model for temporal dependencies in event streams", Retrieved at <<http://research.microsoft.com/pubs/153745/gunawardana11_model_tempor_depen_event_stream.pdf>> 25, 2011, pp. 9.

Heckerman, et al., "Dependency networks for inference, collaborative filtering, and data visualization", Retrieved at <<http://jmlr.csail.mit.edu/papers/volume1/heckerman00a/heckerman00a.pdf>> Oct. 2000, pp. 49-75.

Oliner, et al., "What supercomputers say—an analysis of five system logs", Retrieved at <<http://ieeexplore.ieee.org/stamp/stamp.jsp?tp=&arnumber=4273008>> 37th Annual IEEE Intl Conference on DSN'07, 2007, pp. 10.

\* cited by examiner

FORECASTING A FUTURE EVENT IN AN EVENT STREAM

BACKGROUND

Event streams, which are sequences of discrete events over continuous time, are ubiquitous in many applications, such as system error logs and web search query logs. Learning a model for the temporal dependencies and relationships among events within a system can present a useful paradigm for better understanding the relationships in the system. For example, a system administrator of a datacenter may be interested in knowing how failures on certain machines or machine types can affect failures elsewhere in the datacenter for preemptive maintenance.

The inherent temporal nature of the problem leads to many algorithmic and statistical challenges. In many cases, the model is to learn long-range dependencies, where examining few events in a particular time interval can be insufficient. For example, what a user will query for at a particular time is not just a function of what he has queried for in the previous day, but also what he has previously queried for on that day of the week, as well as at that time of the day, and the topics he has queried for in the past. Similarly, for datacenter logs, the likelihood of a machine failing may depend on many other failures, warnings, and repairs that have accumulated over time, not simply what the machine's status was the day before the possible failure. Moreover, machines are not equally likely to fail, and each user is not equally likely to search for the same topics, so events from different machines or users may not be modeled well if they are assumed to behave identically given the same history.

While graphical models such as Bayesian networks and dependency networks are widely used to model the dependencies between variables, they do not model temporal dependencies. Dynamic Bayesian Networks (DBN) allow for the modeling of temporal dependencies in discrete time. However, it is not clear how continuous-time data could be discretized in order to apply the DBN approach. At a minimum, too slow a sampling rate results in poor representation of the data, and too fast a sampling rate increases the number of samples, making learning and inference more costly. In addition, allowing long term dependencies involves conditioning on multiple steps in the past, and choosing too fast a sampling rate increases the number of such steps that need to be conditioned on. Further, since the number of different event types is typically very large, these models can become quickly intractable.

SUMMARY

The following presents a simplified summary of the innovation in order to provide a basic understanding of some aspects described herein. This summary is not an extensive overview of the claimed subject matter. It is intended to neither identify key nor critical elements of the claimed subject matter nor delineate the scope of the subject innovation. Its sole purpose is to present some concepts of the claimed subject matter in a simplified form as a prelude to the more detailed description that is presented later.

An embodiment provides a method for generating a decision graph from event stream data for predicting events with event labels chosen from a number of event labels, wherein the event stream data includes a number of events, and wherein each of the events includes an event label and an associated time stamp. The method includes generating leaf nodes for the decision graph, wherein each of the leaf nodes includes a rate parameter for a predicted event. The method also includes generating decision nodes for the decision graph, wherein each of the decision nodes includes a question about a predicted event or historical events, or both.

Another embodiment provides a system for forecasting a future event in an event stream. The event stream includes a number of events, wherein each of the events includes an event label and an associated time stamp. The system includes a processor that is adapted to execute stored instructions and a system memory. The system memory includes code configured to generate one or more decision graphs for predicting events with event labels chosen from a number of event labels based on the events within the event stream, wherein the decision graph includes decision nodes and leaf nodes, and wherein each of the decision nodes includes a question. The system memory also includes code configured to analyze event stream data using the decision graph and forecast a future event in the event stream based on the analysis of the event stream data.

In addition, another embodiment provides one or more non-transitory, computer-readable storage media for storing computer-readable instructions. The computer-readable instructions provide a system for predicting a future event in an event stream when executed by one or more processing devices. The computer-readable instructions include code configured to provide a decision tree, wherein the decision tree includes decision nodes and leaf nodes. Each of the decision nodes includes a question about a future event to be forecast or a question about a past event relating to the future event, or both, and each of the leaf nodes includes a rate parameter of a predicted event. The computer-readable instructions also include code configured to analyze event stream data using the decision tree and predict a future event in the event stream based on the analysis of the event stream data.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Numbers in the 100 series refer to features originally found in FIG. 1, numbers in the 200 series refer to features originally found in FIG. 2, numbers in the 300 series refer to features originally found in FIG. 3, and so on.

DETAILED DESCRIPTION

Overview

Embodiments disclosed herein relate to the modeling of streams of diverse structured events. More specifically, embodiments disclosed herein relate to the determination of temporal dependencies between events using conditional intensity models, which are a class of marked point processes that can model the types and timing of events. This may be accomplished by a generating a decision graph, or decision tree, from event stream data and forecasting a future event in the event stream using the decision graph.

According to embodiments disclosed herein, events may be represented as tuples $(t_i, l_i)$, wherein $t_i$ denotes the time the ith event occurred and $l_i$ denotes the label, or event type, such as, for example, the search query or the error message. The techniques disclosed herein may be used to model how likely an event with label l is to occur in a given time conditioned on historical events up to that time. The techniques may model not only the occurrence of a particular label in a particular time interval but also the occurrence of a set of labels spanning different time intervals. In addition, the techniques disclosed herein may be particularly useful for modeling purposes when the set $\mathcal{L}$ of possible labels is large and some of the labels may appear infrequently.

One model, the Piecewise-Constant Conditional Intensity Model (PCIM), captures the dependencies of each type of event on events in the past through a set of piecewise-constant conditional intensity functions. A separate decision tree or decision graph is used to model the dependencies of each event type, yielding a conjugate prior for this model, which allows for the closed-form computation of the marginal likelihood and parameter posteriors. This model factors into local models over the labels The PCIM is defined in terms of a separate local model, e.g., decision tree, being built for each label. As such, achieving computational scalability may be challenging because learning the models has complexity $O(|\mathcal{D}||\mathcal{L}|)$, where $|\mathcal{D}|$ is the number of events in the training dataset. In addition, when $|\mathcal{L}|$ is large, and some of the labels do not appear very often, there may not be enough data to build a separate model for each $l \in \mathcal{L}$.

Embodiments disclosed herein relate to the use of a model that allows structure and parameters to be shared among labels. This model is referred to herein as the Conjoint Piecewise-Constant Conditional Intensity Model (C-PCIM). The sharing of structure and parameters among labels may allow the model to computationally and statistically scale to large label spaces. In addition, the general framework of the model may allow for the use of attributes of labels to learn dependencies for rare labels, as well as handle non-identically distributed data.

Conditional Intensity Models

Events of different types are distinguished by labels l drawn from a finite alphabet $\mathcal{L}$. Each of the labels l may be used to represent a particular event type. An event may include a non-negative time-stamp t and a label l. A history is an event sequence $h = \{(t_i, l_i)\}_{i=1}^n$, where $0 < t_1 < \ldots < t_n$. The data utilized according to embodiments disclosed herein are included within a specific history denoted by $\mathcal{D}$. Given data $\mathcal{D}$, the history at time t is defined as $h(t, \mathcal{D}) = \{(t_i, l_i) | (t_i, l_i) \in \mathcal{D}, t_i \leq t\}$. $\mathcal{D}$ is suppressed from $h(t, \mathcal{D})$ when clear from context and $h_i$ is set to be equal to $h(t_{i-1})$. By convention, $t_0$ is equal to 0. The ending time t(h) of a history h is defined as the time of the last event in h: $t(h) = \max_{(t,l) \in h} t$ so that $t(h_i) = t_{i-1}$.

A Conditional Intensity Model (CIM) is a set of non-negative conditional intensity functions indexed by label $\{\lambda_l(t|h; \theta)\}_{l \in \mathcal{L}}$. The data likelihood for this model is as follows:

$$p(\mathcal{D}|\theta) = \Pi_{l \in \mathcal{L}} \Pi_{i=1}^n \lambda_l(t_i|h_i, \theta)^{\Pi(l=l_i)} e^{-\Lambda_l(t_i|h_i;\theta)}, \quad (1)$$

where $\Lambda_l(t|h; \theta) = \int_{-\infty}^t \lambda_l(\tau|h; \theta) d\tau$, and the function $\Pi(l = l')$ is one if $l' = l$, or 0 otherwise. The conditional intensities are assumed to satisfy $\lambda_l(t|h; \theta) = 0$ for $t \leq t(h)$ to ensure that $t_i > t_{i-1} = t(h_i)$. Any distribution for $\mathcal{D}$ in which the timestamps are continuous random variables can be written in this form. Such models offer an approach for decomposing the dependencies of different event types on the past. In particular, this per-label conditional specification allows for the determination of detailed label-specific dependencies on past events.

Conditional intensity models whose conditional intensity functions are piecewise constant, i.e., PCIMs, have a conjugate prior for $\lambda_l$. This allows for parameter learning and evaluation of the marginal likelihood in closed form. This enables structure learning through a decision graph building procedure, yielding decision graph conditional intensity models. Inference can be carried out using forward sampling for arbitrary finite duration queries for general conditional intensity models. For the class of queries that specify particular sequences of events in given time intervals, low probability queries are evaluated using importance sampling, e.g., Poisson superposition importance sampling.

Figure 1:
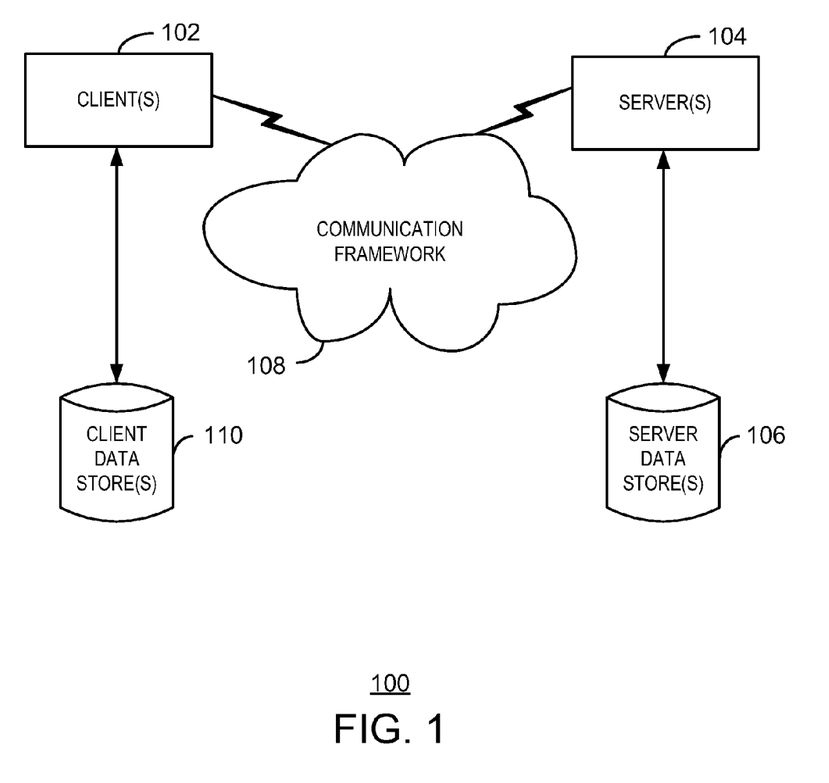
FIG. 1 is a block diagram of a networking environment in which a system and method for modeling streams of diverse structured events may be implemented.

As a preliminary matter, some of the figures describe concepts in the context of one or more structural components, variously referred to as functionality, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, manual processing, and the like, or any combination of these implementations. As used herein, hardware may include computer systems, discrete logic components, such as application specific integrated circuits (ASICs), and the like, as well as any combinations thereof.

As to terminology, the phrase "configured to" encompasses any way that any kind of functionality can be constructed to perform an identified operation. The functionality can be configured to perform an operation using, for instance, software, hardware, firmware and the like, or any combinations thereof.

The term "logic" encompasses any functionality for performing a task. For instance, each operation illustrated in the flowcharts corresponds to logic for performing that operation. An operation can be performed using, for instance, software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware.

By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any non-transitory computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like.

Computing Environment

Figure 2:
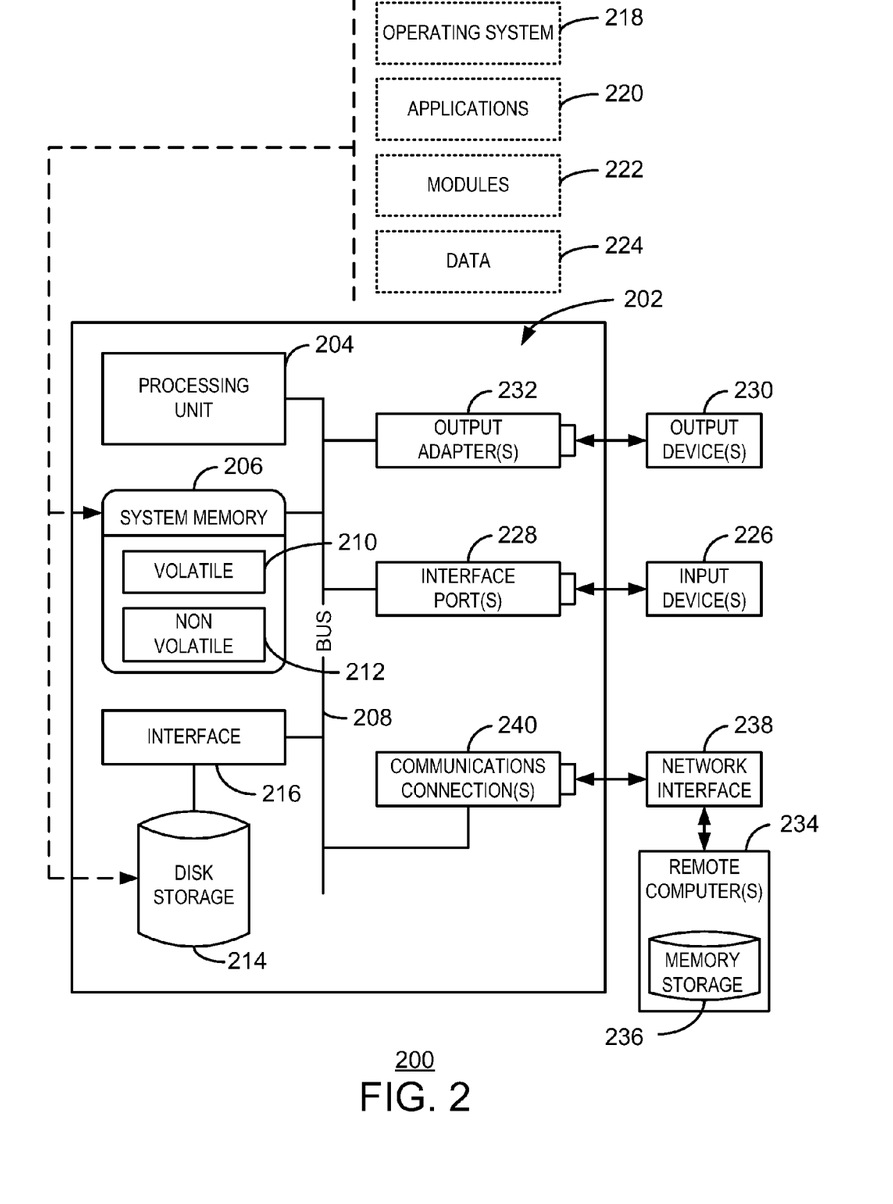
FIG. 2 is a block diagram of a computing environment that may be used to implement a system and method for modeling streams of diverse structured events.

In order to provide context for implementing various aspects of the claimed subject matter, FIGS. 1-2 and the following discussion are intended to provide a brief, general description of a computing environment in which the various aspects of the subject innovation may be implemented. For example, a method and system for generating decision graphs from event stream data and forecasting future events in event streams based on the decision graphs can be implemented in such a computing environment. While the claimed subject matter has been described above in the general context of computer-executable instructions of a computer program that runs on a local computer or remote computer, those of skill in the art will recognize that the subject innovation also may be implemented in combination with other program modules. Generally, program modules include routines, programs, components, data structures, etc., that perform particular tasks or implement particular abstract data types.

Moreover, those of skill in the art will appreciate that the subject innovation may be practiced with other computer system configurations, including single-processor or multi-processor computer systems, minicomputers, mainframe computers, as well as personal computers, hand-held computing devices, microprocessor-based or programmable consumer electronics, and the like, each of which may operatively communicate with one or more associated devices. The illustrated aspects of the claimed subject matter may also be practiced in distributed computing environments wherein certain tasks are performed by remote processing devices that are linked through a communications network. However, some, if not all, aspects of the subject innovation may be practiced on stand-alone computers. In a distributed computing environment, program modules may be located in local or remote memory storage devices.

FIG. 1 is a block diagram of a networking environment 100 in which a system and method for modeling streams of diverse structured events may be implemented. The networking environment 100 includes one or more client(s) 102. The client(s) 102 can be hardware and/or software (e.g., threads, processes, or computing devices). The networking environment 100 also includes one or more server(s) 104. The server(s) 104 can be hardware and/or software (e.g., threads, processes, or computing devices). The servers 104 can house threads to perform search operations by employing the subject innovation, for example.

One possible communication between a client 102 and a server 104 can be in the form of a data packet adapted to be transmitted between two or more computer processes. The networking environment 100 includes a communication framework 108 that can be employed to facilitate communications between the client(s) 102 and the server(s) 104. The client(s) 102 are operably connected to one or more client data store(s) 110 that can be employed to store information local to the client(s) 102. The client data store(s) 110 may be stored in the client(s) 102, or may be located remotely, such as in a cloud server. Similarly, the server(s) 104 are operably connected to one or more server data store(s) 106 that can be employed to store information local to the servers 104.

FIG. 2 is a block diagram of a computing environment 200 that may be used to implement a system and method for modeling streams of diverse structured events. The computing environment 200 includes a computer 202. The computer 202 includes a processing unit 204, a system memory 206, and a system bus 208. The system bus 208 couples system components including, but not limited to, the system memory 206 to the processing unit 204. The processing unit 204 can be any of various available processors. Dual microprocessors and other multiprocessor architectures also can be employed as the processing unit 204.

The system bus 208 can be any of several types of bus structures, including the memory bus or memory controller, a peripheral bus or external bus, or a local bus using any variety of available bus architectures known to those of ordinary skill in the art. The system memory 206 is non-transitory, computer-readable media that includes volatile memory 210 and non-volatile memory 212. The basic input/output system (BIOS), containing the basic routines to transfer information between elements within the computer 202, such as during start-up, is stored in non-volatile memory 212. By way of illustration, and not limitation, non-volatile memory 212 can include read-only memory (ROM), programmable ROM (PROM), electrically-programmable ROM (EPROM), electrically-erasable programmable ROM (EEPROM), or flash memory.

Volatile memory 210 includes random access memory (RAM), which acts as external cache memory. By way of illustration and not limitation, RAM is available in many forms, such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 202 also includes other non-transitory, computer-readable media, such as removable/non-removable, volatile/non-volatile computer storage media. FIG. 2 shows, for example, a disk storage 214. Disk storage 214 includes, but is not limited to, devices like a magnetic disk drive, floppy disk drive, tape drive, Jaz drive, Zip drive, LS-100 drive, flash memory card, or memory stick.

In addition, disk storage 214 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 214 to the system bus 208, a removable or non-removable interface is typically used, such as interface 216.

It is to be appreciated that FIG. 2 describes software that acts as an intermediary between users and the basic computer resources described in the computing environment 200. Such software includes an operating system 218. The operating system 218, which can be stored on disk storage 214, acts to control and allocate resources of the computer 202.

System applications 220 take advantage of the management of resources by the operating system 218 through program modules 222 and program data 224 stored either in system memory 206 or on disk storage 214. It is to be appreciated that the claimed subject matter can be implemented with various operating systems or combinations of operating systems.

A user enters commands or information into the computer 202 through input devices 226. Input devices 226 include, but are not limited to, a pointing device (such as a mouse, trackball, stylus, or the like), a keyboard, a microphone, a joystick, a satellite dish, a scanner, a TV tuner card, a digital camera, a digital video camera, a web camera, or the like. The input devices 226 connect to the processing unit 204 through the system bus 208 via interface port(s) 228. Interface port(s) 228 include, for example, a serial port, a parallel port, a game port, and a universal serial bus (USB). Output device(s) 230 may also use the same types of ports as input device(s) 226. Thus, for example, a USB port may be used to provide input to the computer 202 and to output information from the computer 202 to an output device 230.

An output adapter 232 is provided to illustrate that there are some output devices 230 like monitors, speakers, and printers, among other output devices 230, which are accessible via the output adapters 232. The output adapters 232 include, by way of illustration and not limitation, video and sound cards that provide a means of connection between the output device 230 and the system bus 208. It can be noted that other devices and/or systems of devices provide both input and output capabilities, such as remote computer(s) 234.

The computer 202 can be a server hosting an event forecasting system in a networking environment, such as the networking environment 100, using logical connections to one or more remote computers, such as remote computer(s) 234. The remote computer(s) 234 may be client systems configured with web browsers, PC applications, mobile phone applications, and the like. The remote computer(s) 234 can be a personal computer, a server, a router, a network PC, a workstation, a microprocessor based appliance, a mobile phone, a peer device or other common network node and the like, and typically includes many or all of the elements described relative to the computer 202. For purposes of brevity, the remote computer(s) 234 is illustrated with a memory storage device 236. Remote computer(s) 234 is logically connected to the computer 202 through a network interface 238 and then physically connected via a communication connection 240.

Network interface 238 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 240 refers to the hardware/software employed to connect the network interface 238 to the system bus 208. While communication connection 240 is shown for illustrative clarity inside computer 202, it can also be external to the computer 202. The hardware/software for connection to the network interface 238 may include, for example, internal and external technologies such as mobile phone switches, modems including regular telephone grade modems, cable modems and DSL modems, ISDN adapters, and Ethernet cards.

Modeling Event Streams Using Conditional Intensity Models

Figure 3:
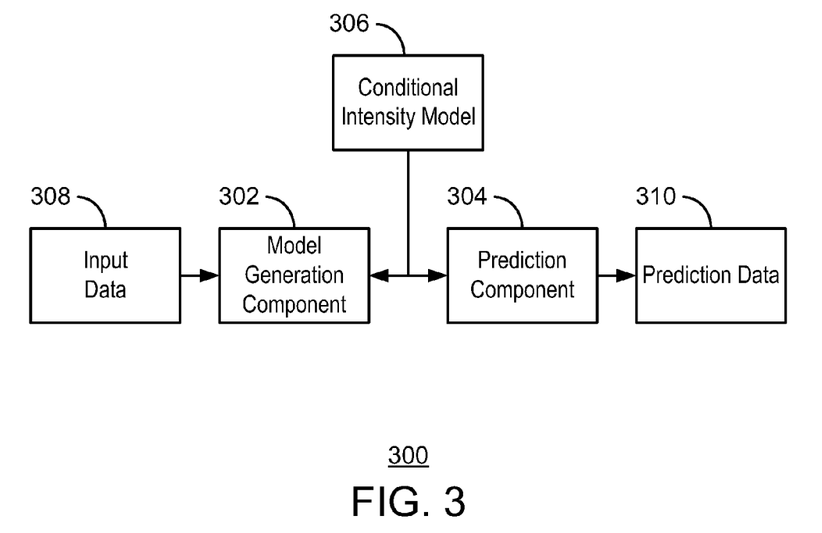
FIG. 3 is a block diagram of a system for determining temporal dependencies between event streams using a conditional intensity model in accordance with the claimed subject matter.

FIG. 3 is a block diagram of a system 300 for determining temporal dependencies between event streams using a conditional intensity model in accordance with the claimed subject matter. The system 300 includes a model generation component 302 and a prediction component 304. The model generation component 302 generates a conditional intensity model 306 based on received input data 308. In one embodiment, the input data 308 is event stream data, such as web search logs or system event logs, with a time associated with each event in the event stream. Based on the generated conditional intensity model 306, prediction component 304 generates prediction data 310 that forecasts future events and times based on past event data.

According to embodiment disclosed herein, the conditional intensity model 306 may be a C-PCIM, as discussed above. The conditional intensity model 306 may include a decision graph, or decision tree. The conditional intensity model 306 may assume piecewise-constant conditional intensity functions. The conditional intensity model 306 may also allow a shared parameter and structure space for a large number of different event types, which increases the computational and statistical efficiency.

In various embodiments, a decision graph is a directed acyclic graph with one root node. Each non-leaf node, or decision node, has associated with it a question, q, which maps inputs to a finite set of answers. Each decision node has a child node, e.g., a leaf node or another decision node, corresponding to each answer. The state space consists of the leaf nodes of the decision graph, which implements the mapping of histories and times to leaf nodes. The set of questions that are considered map histories and times to a finite set of answers.

The conditional intensity model 306 may include a global set of states $\tau$ and a rate parameter associated with each state $\Theta = \{\lambda_s\}_{s \in \Sigma}$. A state function $\sigma(l,t,h)$ may be used to map a label $l$ to an $s \in \Sigma$ given a time t and history h. In addition, the state function $\sigma(l,t,h)$ may be piecewise-constant in t for every l and h.

The likelihood of a particular event occurring, i.e., the likelihood that the state may be represented by a particular label l, can be then written in terms of two statistics, the count, $c_l(s)$, and the duration, $d_l(s)$, which are defined as follows:

$$c_l(s) = \Sigma_{i=1}{}^n \Pi[\sigma(l,t_i,h_i)=s]\Pi[l_i=l], \quad (2)$$

$$d_l(s) = \Sigma_{i=1}{}^n d_l(s,t_i,h_i), \quad (3)$$

where $d_l(s,t,h)$ is the duration that $\sigma(l,\bullet,h)$ spends in state s between times $t(h)$ and t. Thus, the likelihood, or probability, is as follows:

$$p(\mathcal{D} \mid \Sigma, \sigma, \Theta) = \prod_{s \in \Sigma} \prod_{l \in L} \lambda_s^{c_l(s)} e^{-\lambda_s d_l(s)} \quad (4)$$

$$= \prod_{s \in \Sigma} \lambda_s^{\Sigma_{l \in \mathcal{L}} c_l(s)} \exp(-\lambda_s \Sigma_{l \in \mathcal{L}} d_l(s)), \quad (5)$$

where $c(s) := \Sigma_{l \in \mathcal{L}} c_l(s)$ and $d(s) := \Sigma_{l \in \mathcal{L}} d_l(s)$.

In various embodiments, the conditional intensity model 306 includes a shared, or global, state and parameter space. Thus, the state function $\sigma(l,t,h)$ applies to all of the labels l.

According to some embodiments, a conjugate Gamma prior may be used for the parameters $\Theta$, which gives a closed form for the parameter posteriors and for the marginal likelihood of the data given a structure $\mathcal{S}$. A decision tree based learning algorithm may then use the closed form marginal likelihoods to learn the global state and parameter space. Even though the likelihood is not a product of exponential densities, the following Gamma distribution is a conjugate prior for $\lambda_s$:

$$p(\lambda_s \mid \alpha_s, \beta_s) = \frac{\beta_s^{\alpha_s}}{\Gamma(\alpha_s)} \lambda_s^{\alpha_s - 1} e^{-\beta_s \lambda_s}. \quad (6)$$

This Implies the Following:

$$p(\lambda_s \mid \alpha_s, \beta_s, \mathcal{D}) = p(\lambda_s \mid \alpha_s + \Sigma_{l \in} \mathcal{L} c_l(s), \beta_s + \Sigma_{l \in} \mathcal{L} d_l(s)). \quad (7)$$

In addition, the conditional intensity model 306 may also assume the following:

$$p(\theta \mid \mathcal{S}) = \Pi_{s \in \Sigma} p(\lambda_s \mid \alpha_s, \beta_s). \quad (8)$$

Thus, $p(\mathcal{D} \mid \mathcal{S}) = \Pi_{s \in \Sigma} \gamma_s$, where $$\gamma_s = \frac{\beta_s^{\alpha_s}}{\Gamma(\alpha_s)} \frac{\Gamma(\alpha_s + \Sigma_{l \in \mathcal{L}} c_l(s))}{(\beta_s + \Sigma_{l \in \mathcal{L}} d_l(s))^{\alpha_s + \Sigma_{l \in \mathcal{L}} c_l(s)}}. \quad (9)$$

A Bayesian model selection procedure may be used to learn $\Sigma$ and $\sigma(l,t,h)$. Further, a decision graph may be learned, wherein each leaf node corresponds to an $s \in \Sigma$. To evaluate $\sigma(l,t,h)$, beginning at the root node, the basis function $q(t,h,l)$ corresponding to the current node is evaluated to determine which child node to proceed to, and this is performed recursively until a leaf node s has been reached. More formally, $\mathcal{Q}$ denotes a basis set of piecewise-constant state functions $q(t,h,l)$, each taking values in a basis state set $\Sigma_q$. In some embodiments, the conditional intensity model 306 assumes $\Sigma_q = \{0,1\}$, i.e., a binary split, but it is possible to extend to larger sets. Given $\mathcal{Q}$, $\Sigma$ and $\sigma(l,t,h)$ are specified through a decision graph whose interior nodes each have an associated $q \in \mathcal{Q}$ and a child corresponding to each value in $\Sigma_q$. The global state set $\Sigma$ is then the set of leaf nodes in the decision graph. The state function $\sigma(l,t,h)$ is computed by recursively applying the basis state functions in the decision graph until a leaf node is reached. Note that the resulting mapping is a valid state function by construction.

To carry out Bayesian model selection, a factored structural prior $p(\mathcal{S}) \propto \Pi_{s \in \Sigma} \kappa_s$ may be used. In addition, the following score function may be defined in order to find an appropriate basis state function on which to split:

$$\text{Gain} = \frac{p(S' \mid D)}{p(S \mid D)} \quad (10)$$

$$= \frac{\prod_{s \in \Sigma'} \kappa_s \gamma_s}{\prod_{s \in \Sigma} \kappa_s \gamma_s} \quad (11)$$

$$= \frac{\prod_{j=1}^{m_q} \kappa_{s_j} \gamma_{s_j}}{\kappa_s \gamma_s}. \quad (12)$$

In some embodiments, the basis state function with the highest Gain is selected in order to determine each split in the decision graph.

Basis State Functions

The modeling power of the conditional intensity model 306 is determined by the basis $\mathcal{Q}$ of state functions selected. In general, three types of basis state functions, i.e., history basis state functions, label basis state functions, and matching basis state functions, are used for the conditional intensity model 306, as discussed below. However, any number of additional types of basis state functions may also be used according to the system and method disclosed herein.

A history basis state function $q(l,h,t) \in \mathcal{Q}$ is a function of the history h and the time t. However, a history basis state functions is not a function of the label l. In some embodiments, the conditional intensity model 306 may use a history-bin basis state function $q_{l',d_1,d_2}(l,h,t)$ that is indexed by a label $l' \in \mathcal{L}$ and time offsets $d_1$ and $d_2$, which indicate a time interval $[t-d_2, t-d_1)$. In various embodiments, $q_{l',d_1,d_2}(l,h,t)=1$ if l' occurred in $[t-d_2, t-d_1)$, or 0 otherwise.

A label basis state function $q(l,h,t) \in \mathcal{Q}$ is a function of the label l, but not of the hisotry h and the time t. This type of basis state function allows different labels to be mapped to different states. In some embodiments, the conditional intensity model 306 may use a label basis state function $q_{l'}(l,h,t)$ that is indexed by a label l', wherein $q_{l'}(l,h,t)=1$ if and only if $l'=l$, or 0 otherwise.

Matching basis state functions relate a specific class of questions that are a function of history, time and label. For example, in some embodiments, the conditional intensity model 306 may use a matching basis state function $q_{d_1,d_2}(t,h,l)$, wherein $g_{d_1,d_2}(t,h,l)=1$ if label l occurred in interval $[t-d_2, t-d_1)$, or 0 otherwise. This matching basis state function may be 1 if l has appeared before in a specified time interval and 0 if it has not appeared. This is useful in learning the pattern "if an event occurred before, it is more likely to occur again," which is applicable in many event streams.

Thus, the set of basis state functions $\mathcal{Q}$ can be partitioned into the history basis state functions $\mathcal{Q}^{history}$, the label basis state functions $\mathcal{Q}^{label}$, and the matching basis state functions $\mathcal{Q}^{matching}$. conditional intensity models that use only history basis state functions are not Conjoint.

Learning Dependencies for Rare Labels via Structured Label Spaces

In various embodiments, the conditional intensity model 306 may use structured label spaces to learn dependencies between rare labels that may not appear in the training set, but may appear in the test set. For example, a machine might have a disk error during testing but not during training. In some embodiments, it may be assumed that each label is structured. In other words, each label contains certain attributes that may be shared across different labels.

More formally, consider a set of attributes $\mathcal{A}$, where each attribute $a \in \mathcal{A}$, has $\mathcal{V}_a$ values. Each label $l \in \mathcal{L}$ has attribute value $v_{a,l} \in \mathcal{V}_a$ for each $a \in \mathcal{A}$. Let $\mathcal{V}$ denote the set of all attribute values, i.e., $\mathcal{V} = \cup_{a \in \mathcal{A}} \mathcal{V}_a$. For example, in datacenter logs, the set of attributes could be $\mathcal{A}$={machineid, machinetype, messagetype}. Thus, a particular label $l \in \mathcal{L}$ might relate to a specific machine identification (ID), machine type, and message type. Therefore, although a particular label $l \in \mathcal{L}$ may not appear in the training set, other labels that have similar attribute values to l, such as, for example, a label with the same message type but a different machine ID, may appear in the training set. Using such attributes, basis state functions may be constructed that allow for the exploitation of similarities among labels. Such basis state functions may include history attribute basis state functions, label attribute basis state functions, and matching attribute basis state functions, among others.

A history attribute basis state function $q_{v,d_1,d_2}(l,h,t)$ is indexed by an attribute value $v \in \mathcal{V}$ and time offsets $d_1$ and $d_2$ that indicate a time interval $[t-d_2, t-d_1)$. In various embodiments, $q_{v,d_1,d_2}(l,h,t)=1$ if a label $l' \in \mathcal{L}$ with attribute value v occurred in $[t-d_2, t-d_1)$, or 0 otherwise.

A label attribute basis state function $q_v(t,h,l)$ is indexed by an attribute value $v \in \mathcal{V}$. In various embodiments, $q_v(t,h,l)=1$ if and only if l has property value v, or 0 otherwise.

A matching attribute basis state function may be written as $q_{a,d_1,d_2}(t,h,l)$, where $q_{a,d_1,d_2}(t,h,l)=1$ if a label l' such that $v_{a,l'}=v_{a,l}$ occurred in interval $[t-d_2, t-d_1)$, or 0 otherwise. The matching attribute basis state function may be 1 if l has appeared before in a specified time interval, or 0 if it has not appeared. This may be useful, for example, in learning the pattern "if an event with a certain attribute value occurred before, then another event with the same attribute value is likely to occur again."

Figure 4:
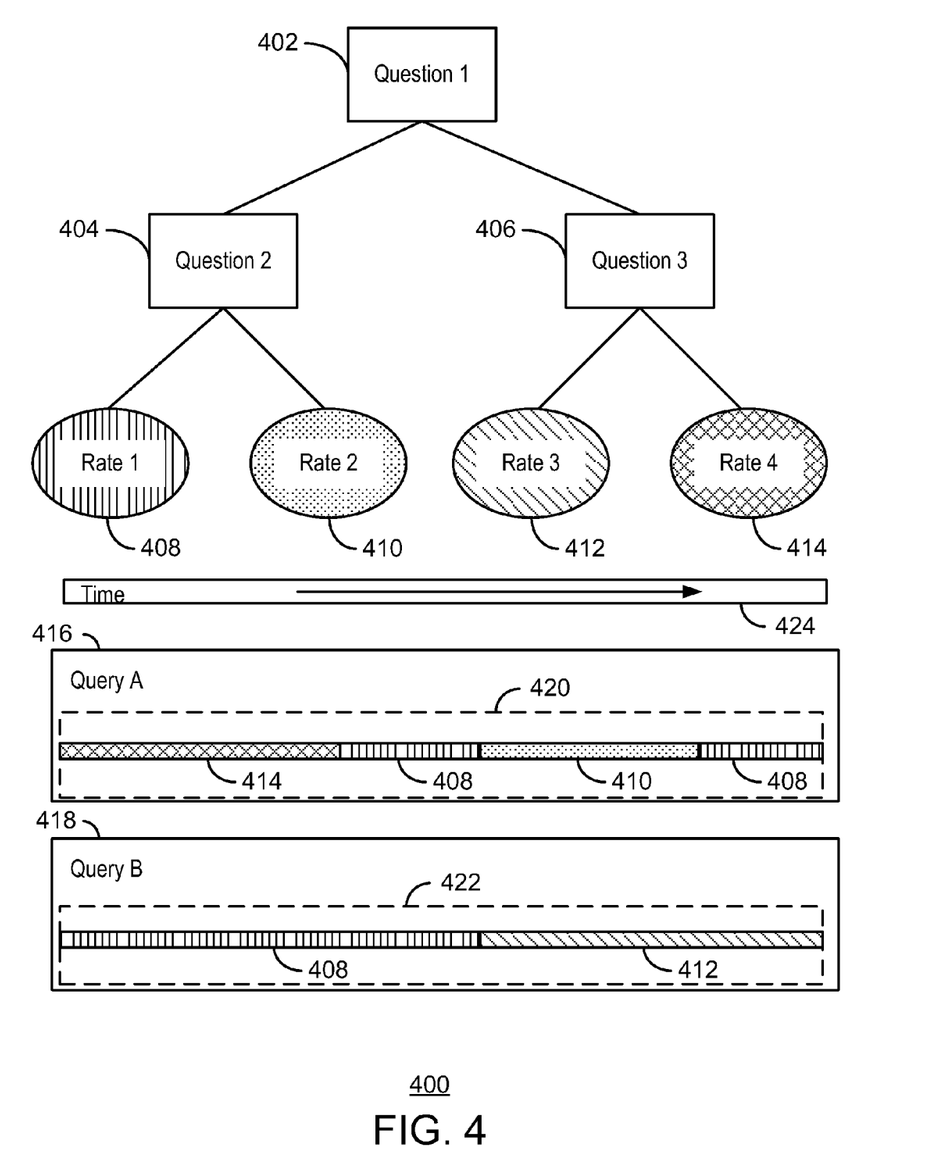
FIG. 4 is a block diagram of a decision graph that may be used in accordance with the claimed subject matter.

FIG. 4 is a block diagram of a decision graph 400 that may be used in accordance with the claimed subject matter. Like numbered items are as described with respect to FIG. 3. In various embodiments, the decision graph 400 uses different types of basis state functions. The decision graph 400 may include a number of decision nodes 402, 404, and 406 and a number of leaf nodes 408, 410, 412, and 414. Each of the decision nodes 402, 404, and 406 may include a question, i.e., Question 1, Question 2, and Question 3, respectively. The decision process begins at the top, or root, decision node 402, and the answer, i.e., yes or no, to the question at the root decision node 402 indicates which decision node 404 or 406 to move to next. For example, if the answer to Question 1 at the root decision node 402 is no, the decision process moves to decision node 404 to answer Question 2. If the answer to Question 1 at the root decision node 402 is yes, the decision process moves to decision node 406 to answer Question 3. The questions in the decision nodes 402, 404, and 406 are answered based on the input data 308 discussed with respect to FIG. 2. At the end of the decision graph 400 are the leaf nodes 408, 410, 412, and 414. According to FIG. 4, $\Sigma$ includes the four leaf nodes 408, 410, 412, and 414, each of which is associated with a speed or rate parameter, e.g., Rate1, Rate2, Rate3, and Rate4, respectively.

The decision graph 400 may be used to obtain answers to, or the states of, multiple queries simultaneously. For example, as shown in FIG. 4, a query A 416 and a query B 418 may be analyzed using the decision graph 400. The query A 416 and the query B 418 may include two different values of the label l, and may share the same value of the history h. Thus, the query A 416 and the query B 418 may each include distinct values 420 and 422, respectively, of the state function, $\sigma(l,t,h)$ as a function of time 424.

According to one embodiment, the conditional intensity model 306 described with respect to FIG. 3 is used to simulate event sequences for the purpose of forecasting future events. This is done by simulating the events one at a time. Given the history of events so far, a time is randomly sampled for each event type, assuming that each event time happens at the rate specified by the conditional intensity model 306. The race participants are the various types of events that might occur. The event type with the earliest sampled time is deemed to occur at that time, and is added to the history of events so far. The process is repeated, with the new times being sampled given the updated history, to generate forecasted events one by one into the future. All of the events may be represented by the decision graph 400 in the conditional intensity model 306. In some embodiments, the leaf nodes 408, 410, 412, and 414 of the decision graph 400 may be used to represent individual states, e.g., the occurrence a particular event at a particular point in time based on historical events. The rate parameters at the leaf nodes 408, 410, 412, and 414 of the decision graph 400 may define the rate at which events of a particular type happen at a particular time given a particular history, as represented by the decision graph 400. The rate of each event type may vary over time. The current rate of each event type may be determined by answering the questions in the decision nodes 402, 404, and 406 until a leaf node 408, 410, 412, or 414 is reached that indicates the current rate parameter of that particular event type.

In various embodiments, generating the decision graph 400 for the conditional intensity model 306 involves a couple of steps. The set of questions for the decision nodes 402, 404, and 406, as well as the order in which to ask the questions, are determined, and then the values for the rates at the leaf nodes 408, 410, 412, and 414 are determined Regarding setting the values for the rate parameters, each leaf node 408, 410, 412, and 414 corresponds to a particular state. For example, assume that the decision process has gone through the decision graph 400 and reached a leaf node 408, 410, 412, or 414 that indicates that the user has issued a car insurance query in the last minute, and has issued a used car query in the last month. The input data 308, e.g., search logs, for all users is examined, and it is determined how long each user has been in that state, i.e., the state where the user has issued a car insurance query in the last minute and a used car query in the last month. The process next involves determining how many times the user actually issued a car insurance query when they were in that state. This gives a count of how many times the event to be predicted occurred in that state. The process also involves determining how long they were in that state, which allows a rate, e.g., a number of occurrences per second, to be determined.

Regarding the determination of the set of questions and the order in which to arrange the questions within the decision graph 400, a set of possible questions are provided. Each of the questions is evaluated using the input data 308, and a question that splits the input data 308 into the most dissimilar piles or groups is identified. This process is repeated for each resulting pile or group. The process continues until the remaining questions are no longer able to split the data into groups that are sufficiently dissimilar, e.g., that satisfy a dissimilarity threshold.

In one embodiment, a factored structural prior is used, and the space of possible structures is searched as follows. The process begins with a trivial decision graph that maps all histories and times to the root decision node 402. This yields a conditional intensity function with no dependencies on any labels. The nodes in the decision graph are iteratively split and merged. A node is split by applying a question to obtain new nodes. The gain in the posterior of the structure due to the split is calculated. A pair of nodes is merged to a new state, generating a new state space. The gain in the posterior of the structure due to this merge is calculated. The next structure is chosen by updating the current structure by choosing the best split or merge, until there is no gain. In one embodiment, the computation of the gain due to a merge or split depends on the states being merged or split and their associated parameters.

According to one embodiment, the dissimilarity measure and the gain measure discussed above are measures of the purity of outcomes in the resulting nodes 402-414 of the decision graph 400. In one embodiment, the nodes 402-414 in the decision graph 400 are split or merged greedily in order to maximize the measure of purity. The measure of purity according to one embodiment is one of a Bayesian score, a likelihood, or a penalized likelihood. In one embodiment, after generating the conditional intensity model 306, the conditional intensity model 306 is pruned back via cross-validation.

Exploiting Sparsity for Fast Implementation

In various embodiments, the conditional intensity model 306 may take advantage of sparsity to reduce computational complexity from $O(|\mathcal{D}|\|\mathcal{L}|)$ to $O(|\mathcal{D}|\|E|)$, where E is generally a set much smaller than $|\mathcal{L}|$. For simplicity, embodiments disclosed herein relate to the use of history, label, and matching basis state functions and do not explicitly describe the implementation of attribute basis functions, although the same principles can be applied.

The decision graph 400, and hence the state space, is grown breadth-first. Thus, at iteration k, the optimal splits for all the leaf nodes 408, 410, 412, and 414 at level k are simultaneously computed. This involves computing all the sufficient statistics, e.g., counts and durations, for each leaf node 408, 410, 412, and 414, as well as for all candidate splits. Let $s_q = \{s_q^{(0)}, \ldots, s_q^{(|\Sigma_q|)}\}$ denote the new states formed if basis state function q was used to split leaf node s. In order to evaluate this split, $c(s_q):=\{c(s_q^{(0)}), \ldots, c(s_q^{(|\Sigma_q|)})\}$ and $d(s_q):=\{d(s_q^{(0)}), \ldots, d(s_q^{(|\Sigma_q|)})\}$ are computed. For simplicity, it is assumed that $\Sigma_q=\{0,1\}$ $\forall q$, so $c(s_q)=\{c(s_q^{(0)}), c(s_q^{(1)})\}$ and $d(s_q)=\{d(s_q^{(0)}), d(s_q^{(1)})\}$.

In some embodiments, $Q_s$ may be denoted as the set of basis state functions that are "active," i.e., that are valid candidates for a split, at leaf node s. A basis state function is a valid candidate for a split if its score is not negative infinity, i.e., if it provides a nontrivial split. Thus, only $c(s_q)$ and $d(s_q) \forall s \in Q_s$ may be computed. Note that when $\Sigma_q=\{0,1\}$, computing $c(s)$, $d(s)$, $c(s_q^{(1)})$, and $d(s_q^{(1)})$ is sufficient, since $c(s_q^{(0)})=c(s)-c(s_q^{(1)})$ and $d(s_q^{(0)})=d(s)-d(s_q^{(1)})$.

In order to compute the counts and the durations, the algorithm makes a pass through the data and updates the counts and durations every time a changepoint c occurs. Formally, a changepoint c is the smallest time $t > c_{prev}$ such that there exists some $q \in \mathcal{Q}$ and $l \in \mathcal{L}$ such that $q(l, h(t, \mathcal{D}), t) \neq q(l, h(t_{c_{prev}}, \mathcal{D}), c_{prev})$, where $c_{prev}$ is the time of the previous changepoint, and it is assumed that the first changepoint is at t=0.

Between changepoints, $\sigma(l,t,h)$ remains constant by definition. Therefore, $d:=c-c_{prev}$ is the amount that the duration will be incremented at changepoint c. Note that the count may be incremented only when a new event $(t_i, l_i)$ occurs, which is a specific type of changepoint.

In order to update c(s) and d(s) as shown in Eqs. (2) and (3), for each leaf node $s \in \Sigma$, the set of labels $V_s$ that currently map to s, i.e., $V_s := \{l \in \mathcal{L} : \sigma(l, t, h) = s\}$, is to be known. $V_s$ may be referred to as the active label set for leaf node s. This mapping is recomputed at every changepoint since it changes as a function of t and h. In some embodiments, the active label set for each leaf node may be determined by explicitly computing $\sigma(l,t,h) \forall l \in \mathcal{L}$, which takes $O(\mathcal{L})$ time.

Once the active label sets have all been computed, it is relatively easy to compute $Q_s = Q_s^{history} \cup Q_s^{label} \cup Q_s^{matching}$, the set of active questions at that leaf node. $Q_s^{history}$ is independent of $V_s$ and can be stored and updated as the changepoints occur. $Q_s^{label}$ includes the basis state functions $q_l$, such that $l \in V_s$. Because $Q_s^{matching}$ is small, it may be assumed that the matching questions are active.

In addition, the counts and durations are to be updated for each $q \in Q_s$. A pass may be made through all of $q \in Q_s$, and the statistics of each function may be updated. However, this takes at least $O(\mathcal{L})$ time, since there are at least $O(\mathcal{L})$ label basis state functions.

The pseudo code shown below summarizes the above implementation:

```
Input: D, decision tree of depth k that defines Σ, σ
Output: decision tree of depth k + 1 that defines new Σ, σ
    for each changepoint c in D do
        d := c - c_prev
        Compute active label sets V_s ∀s ∈ Σ by
            computing σ(l, t, h)   ∀l ∈ L
        for each leaf s ∈ Σ do
            if changepoint is a result of a new event (t_i, l_i)
            then
                c(s) ← c(s) + 1; c(s_q^(1)) ← c(s_q^(1)) + 1 for
                    relevant basis state
                functions that use l_i
            end if
            d(s) ← d(s) + |V_s| * d; Update d(s_q^(1)) for each q ∈ Q_s
        end for
    end for
    for each leaf s ∈ Σ do
        For each q ∈ Q_s, compute c(s_q)^(0) = c(s) - c(s_q^(1)) and
        d(s_q^(0)) = d(s) - d(s_q^(1)).
        Use Eq. (12) to find split.
    end for
```

Since there are $O(|\mathcal{D}|)$ change points, and updating statistics at each changepoint takes $O(\mathcal{L})$, computing splits at each level in the decision graph 400 takes $O(|\mathcal{D}|\|\mathcal{L}|)$. However, computing active label sets and updating counts and durations for active questions can be done in significantly less than $O(\mathcal{L})$ time using a more efficient method for computing active label sets, as discussed further below.

Consider the problem of computing the active label sets for all the leaf nodes $s \in \Sigma$ in less than $O(|\mathcal{L}|)$ time given history h and time t. When evaluating a particular basis function at an internal node i in the decision graph 400, the set of labels $l \in \mathcal{L}$ such that $q_i(l,t,h)=1$ is denoted as $E_i$, while the set of labels such that $q_i(l,t,h)=0$ is denoted as $\overline{E_i}$. In some embodiments, it may be assumed that the sets $E_i$ are small and can be stored explicitly, while the complement sets $\overline{E_i}$ are not. For example, in the case of label functions, $q_l(l,h,t)$ is only 1 when $l=l'$ and therefore $|E_1|=1$, while $|\overline{E_1}|=|\mathcal{L}|-1$. Similarly, for matching basis functions, $q_{d_1,d_2}(l,h,t)$ only evaluates to 1 when l has appeared in the window $[t-d_2, t-d_1)$, which is generally not highly likely. History basis state functions do not partition the label space and, therefore, are easy to handle.

This assumption allows for a reduction in complexity from $O(|\mathcal{L}|)$ to $O(|E|)$, where $|E| = \max_i |E_i|$. More specifically, $V_s$ may be represented and stored efficiently without computing an $\overline{E}_i$ explicitly, which would essentially be looping over most of the labels. In addition, $V_s$ can be expressed as a series of intersections of some of the sets $E_i$ and $\overline{E}_j$.

Figure 5:
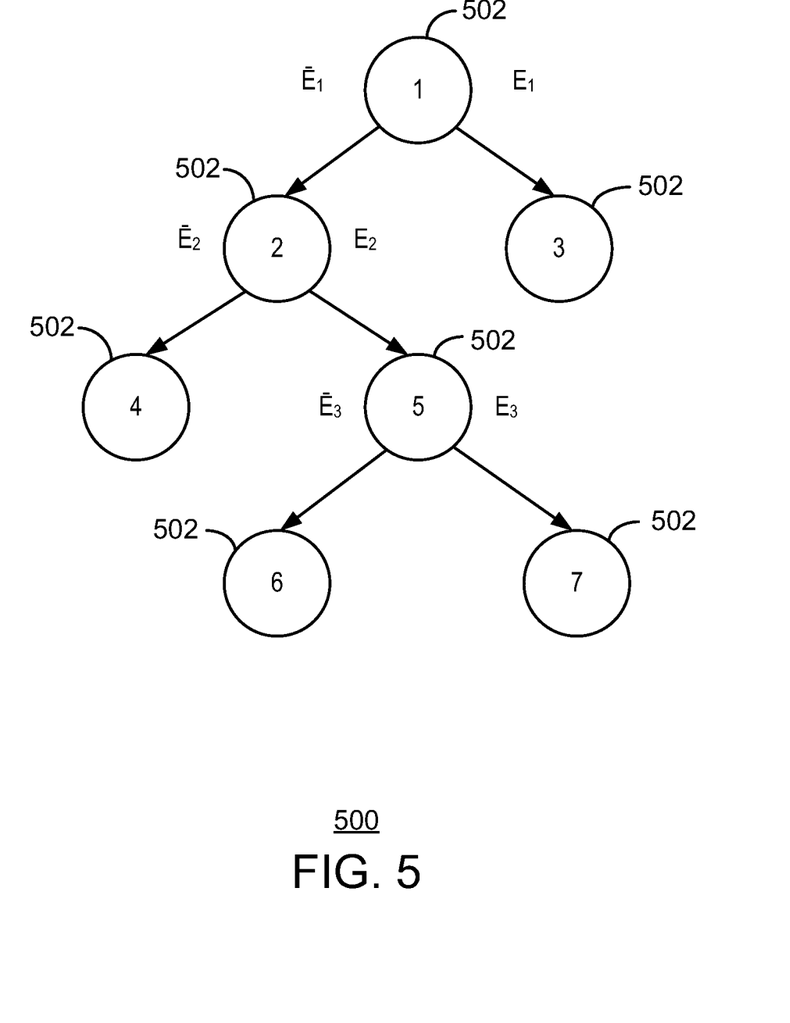
FIG. 5 is a schematic illustrating the computation of active label sets in accordance with the claimed subject matter.

FIG. 5 is a schematic 500 illustrating the computation of active label sets in accordance with the claimed subject matter. The schematic 500 includes seven nodes 502, i.e., nodes 1-7. In various embodiments, the size of the label set at node 6, for example, may be computed as follows:

$$V_s = \overline{E}_1 \cap E_2 \cap \overline{E}_3 = \overline{E}_1 \cap \overline{E}_3 \cap E_2. \tag{13}$$

In general, each $V_s$ can be expressed as a series of intersections of either the sets $E_i$ or their complements. In addition, $\mathcal{J}_s$ may be the indices of the non-complemented sets $E_i$ in this intersection, and $\overline{\mathcal{J}}_s$ may be the indices of the complemented sets. Because intersections are commutative, the following equation may be used:

$$V_s (\cap_{i \in \mathcal{J}_s} E_i) \cap (\cap_{j \in \overline{\mathcal{J}}_s} \overline{E}_j). \tag{14}$$

Using DeMorgan's Law, Eq. (14) may be written as:

$$V_s (\cap_{i \in \mathcal{J}_s} E_i) \cap (\overline{\cup_{j \in \overline{\mathcal{J}}_s} E_j}). \tag{15}$$

Further, $\mathcal{Y}_s := \cap_{i \in \mathcal{J}_s} E_i$ and $\mathcal{Z}_s := \cup_{j \in \overline{\mathcal{J}}_s} E_j$ are computable in O(|E|) time. Thus, the following equation may also be used:

$$V_s = \mathcal{Y}_s \cap \overline{\mathcal{Z}}_s = \mathcal{Y}_s - \mathcal{Y}_s \cap \mathcal{Z}_s. \tag{16}$$

As a result, instead of explicitly storing the set of active labels at a leaf node, only $\mathcal{Y}_s = \cap_{i \in \mathcal{J}_s} E_i$, i.e., the positive set, and $\mathcal{Z}_s = \cup_{j \in \overline{\mathcal{J}}_s} E_j$, i.e., the negative set, may be explicitly stored, if they exist. If $\mathcal{Y}_s$ exists, the entire set $V_s$ can be computed easily. However, in the branch where all the basis functions have evaluated to zero, only $\mathcal{Z}_s$ exists. Thus, $V_s$ cannot be explicitly computed, since it is $\mathcal{L} \setminus \mathcal{Z}_s$.

This reduces the complexity of computing active label sets to O(|E|) instead of O(|$\mathcal{L}$|), where it is assumed that |E| is significantly smaller than |$\mathcal{L}$|, e.g., it is assumed that the size of the decision graph 400 is negligible. The following pseduo code summarizes the aformentioned implementation for computing the splits efficiently:

```
Input: D, decision tree of depth k that defines Σ, σ
Output: decision tree of depth k + 1 that defines new Σ, σ
    Initialize gdur_s = 0 ∀s ∈ Σ
    for each changepoint c in D do
        d: = c − c_prev
        Compute V_s  ∀s ∈ Σ using Eqs. (13)-(16).
        for each leaf s ∈ Σ do
            if changepoint is a result of a new event (t_i, l_i)
            then
                c(s) ← c(s) + 1; c(s_q^(1)) ← c(s_q^(1)) + 1 for relevant basis
                state functions that use l_i
            end if
            d(s) ← d(s) + |V_s| * d; Update d(s_q^(1)) for each q ∈ Q_s,matching,
            and q ∈ Q_s,history
            if |V_s| is small then
                for each label basis function q_l, s.t. l' ∈ V_s
                do
                    d(s_q^(1)) = d(s_q^(1)) + d
                end for
            else
                gdur_s ← gdur_s + d
                for each label basis function q_l, s.t. l' ∈ V̄_s
                do
                    d(s_q^(1)) = d(s_q^(1)) − d
                end for
            end if
        end for
    end for
    for each leaf s ∈ Σ do
        for each label basis function q_l, s.t. l' ∈ L do
            d(s_q^(1)) = d(s_q^(1)) + gdur_s
        end for
        For each q ∈ Q_s, compute c(s_q)^(0) = c(s) − c(s_q^(1)) and
        d(s_q^(0)) = d(s) − d(s_q^(1)).
        Use Eq. (12) to find best split.
    end for
```

Once the active label sets of each leaf node have been computed, the counts and durations of the active questions $q \in Q_s$ may be incremented. In various embodiments, incrementing counts may be performed only when a new event $(t_i, l_i)$ arrives. In addition, the update may have low computational complexity, since only a few active questions that use $l_i$ may be incremented.

However, when a changepoint occurs, the duration statistic may be updated for all active questions. This can potentially be costly because there are O($\mathcal{L}$) label basis state functions, and each label $l \in \mathcal{L}$ is mapped to exactly one leaf node, which is conditioned on h and t. This implies that each label basis state function is active at exactly one leaf node.

The implementation that is illustrated by the pseudo code shown above reduces the complexity to O(|D||E|) instead of O(|D||L|), where |E| is significantly smaller than |L| in practice. This implementation can also be extended to instances in which the attribute basis state functions and the size of |E| depend on the number of labels that share a particular attribute value.

Methods for Modeling Streams of Diverse Structured Events

Figure 6:
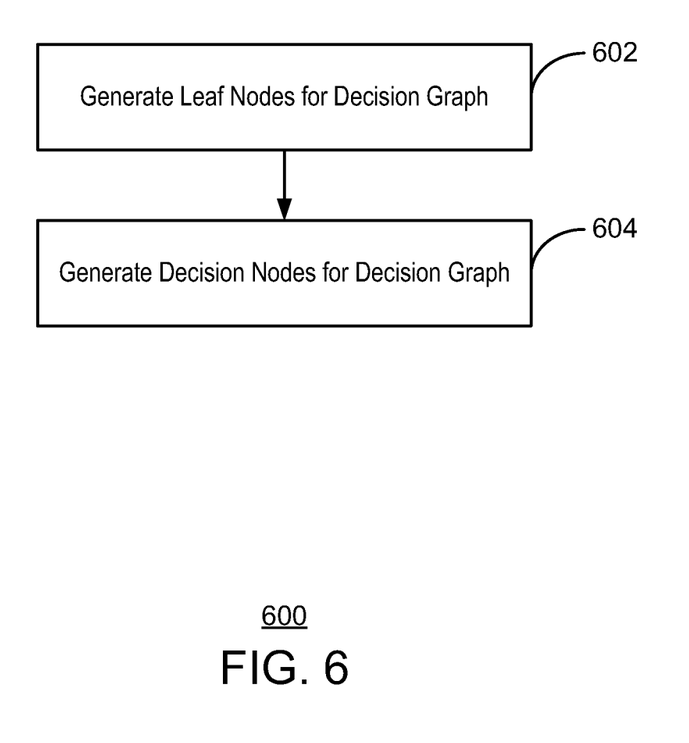
FIG. 6 is a process flow diagram showing a method for generating a decision graph from event stream data in accordance with the claimed subject matter.

FIG. 6 is a process flow diagram showing a method 600 for generating a decision graph from event stream data in accordance with the claimed subject matter. The decision graph may be used to predict events with event labels chosen from a number of event labels. In some embodiments, the event stream data includes data from search queries or datacenter logs, among others. In various embodiments, the decision graph may be the decision graph 400 discussed with respect to FIG. 4. The decision graph may also be a decision tree, in which no nodes having more than one parent. In addition, the decision graph may represent a conditional intensity model, such as the conditional intensity model 306 discussed with respect to FIG. 3.

The event stream data that is utilized by the method 600 may be temporal data, historical data, and event type data. The event stream data may include a number of events. Each of the events may include an event label and an associated time stamp. The event label for an event may include a set of properties relating to the event.

The method 600 begins at block 602, at which leaf nodes for the decision graph are generated. Each of the leaf nodes may include a rate parameter of a predicted event. The rate parameter of the predicted event may be a measure of a number of events per unit time. The rate parameter may represent the number of times the events occurred, or are predicted to occur, within a certain amount of time. Such a prediction may be based, at least in part, on historical data regarding the set of predicted events. Further, in some embodiments, the events within the set of predicted events may share a global set of states, which may be referred to as a shared parameter and structure space. The use of such a global set of states may allow for the incorporation of a wide range of events of different event types into one decision graph.

At block 604, decision nodes for the decision graph may be generated. Each of the decision nodes may include a question about the set of predicted events or historical events, or both. In addition, at least one decision node may include a question about a predicted event, or about both a predicted event and historical events. More specifically, the question for each decision node may relate to the event label of a predicted event and/or its properties, or may relate to historical events in the event stream as of a particular time and/or their properties, or both.

In some embodiments, a question about a predicted event includes a question about a property of the event label, wherein the property may include an identity of the event label, a category of the event label, or an attribute of the event label. A question about historical events may include a question about an existence or a count of events with a particular property in the historical events in a particular time window relative to a given time, wherein the particular property includes an identity of the event label, a category of the event label, or an attribute of the event label. A question about both a predicted event and historical events may include a question about a property of the event label of the predicted event and an existence or a count of events with a particular property in the historical events in a particular time window relative to a given time.

It is to be understood that FIG. 6 is not intended to indicate that the steps of the method 600 are to be executed in any particular order, or that all of the steps are to be included in every case. Further, any number of additional steps may be included within the method 600, depending on the specific application. For example, the decision graph may be built by iteratively splitting and merging decision nodes or leaf nodes, or both, in the decision graph to increase a measure of purity of outcomes in the leaf nodes, as discussed further with respect to FIG. 7. In addition, the method 600 may be used to build a decision graph for each of two or more non-overlapping sets of predicted events.

In some embodiments, the decision graph is used to predict an occurrence of a specific event or set of events at a specific time given the history up to that time. The use of the decision graph for the prediction of a future event in the event stream is discussed further below with respect to FIG. 8.

Figure 7:
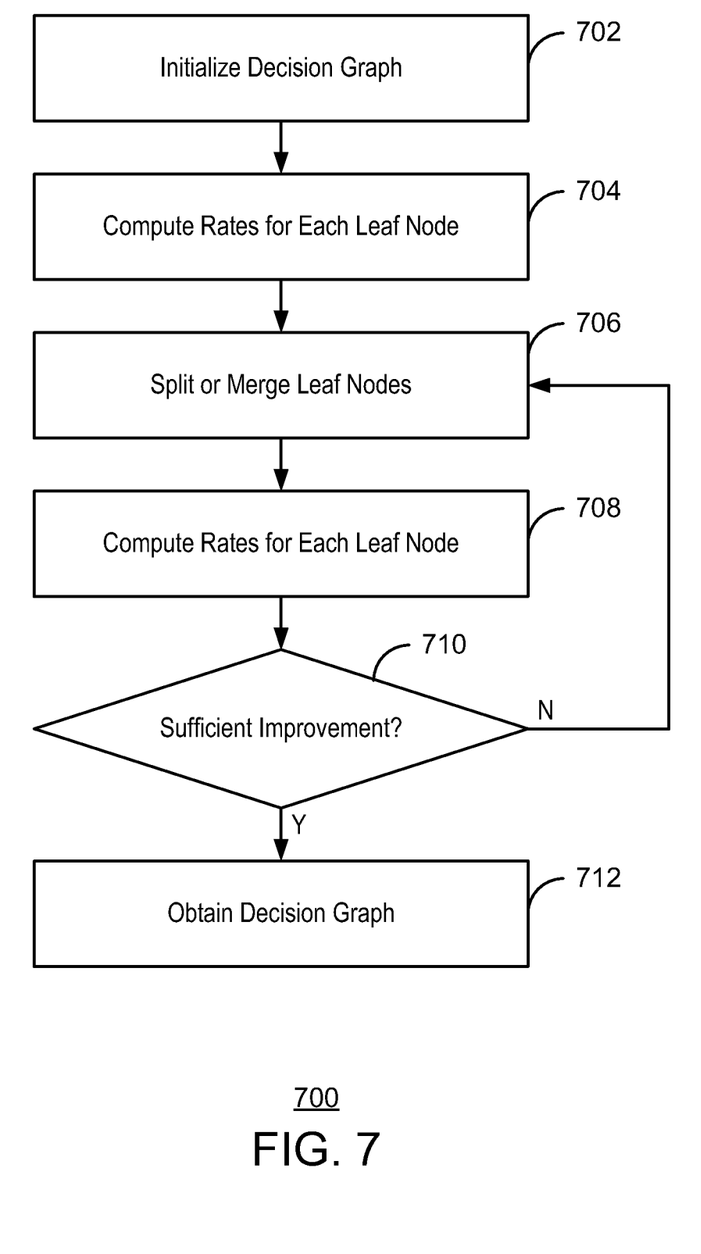
FIG. 7 is a process flow diagram showing a method for generating a decision graph with a certain degree of purity of outcomes in the leaf nodes of the decision graph in accordance with the claimed subject matter.

FIG. 7 is a process flow diagram showing a method 700 for generating a decision graph with a certain degree of purity of outcomes in the leaf nodes of the decision graph in accordance with the claimed subject matter. The method begins at block 702, at which the decision graph is initialized to a single root node. At block 704, the rates for the leaf nodes are computed. A measure of purity of outcomes for the leaf nodes may be calculated. Such a measure of purity may include, for example, a likelihood.

At block 706, the leaf nodes are iteratively split and merged to increase the measure of the purity of outcomes for the leaf nodes. At block 708, the rates for the leaf nodes are computed. At block 710, a determination of whether the measure of purity of outcomes for the leaf nodes has been sufficiently improved is made. If sufficient improvement has been made, the decision graph is obtained at block 712. If sufficient improvement has not been made, the method 700 returns to block 706.

Figure 8:
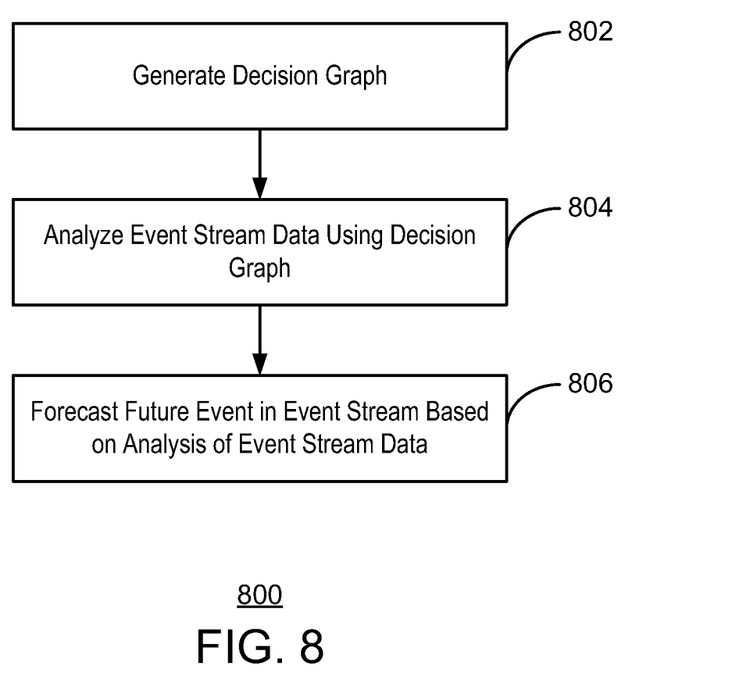
FIG. 8 is a process flow diagram showing a method for forecasting a future event in an event stream in accordance with the claimed subject matter.

FIG. 8 is a process flow diagram showing a method 800 for forecasting a future event in an event stream in accordance with the claimed subject matter. The method 800 begins at block 802 with the generation of a decision graph. In various embodiments, the decision graph may be generated according to the method 600 discussed above with respect to FIG. 6.

At block 804, event stream data may be analyzed using the decision graph. In various embodiments, analyzing the event stream data includes determining a number of decision nodes with questions that are relevant to the event label of a future event to be forecast, and determining a number of decision nodes with questions that are relevant to a past event, or historical event, within the event stream that relates to the future event to be forecast.

At block 806, a future event in the event stream may be forecast based on the analysis of the event stream data. The future event in the event stream may be modeled by a specific state that is represented by one of the leaf nodes. In various embodiments, forecasting the future event includes predicting the future event based on answers to the decision nodes with the questions that are relevant to the future event and answers to the decision nodes with the questions that are relevant to the past event. Then, the future event may be forecast by determining a leaf node that includes the future event based on the answers to the decision nodes.

It is to be understood that FIG. 8 is not intended to indicate that the steps of the method 800 are to be executed in any particular order, or that all of the steps are to be included in every case. Further, any number of additional steps may be included within the method 800, depending on the specific application.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for generating a decision graph from event stream data for predicting events with event labels chosen from a plurality of event labels, wherein the event stream data comprises a plurality of events, and wherein each of the plurality of events comprises an event label and an associated time stamp, the method comprising:
   generating leaf nodes for the decision graph, wherein each of the leaf nodes comprises a rate parameter of a predicted event; and
   generating decision nodes for the decision graph, wherein each of the decision nodes comprises a question about a predicted event or historical events, or both, wherein the decision nodes are parents to the leaf nodes, and wherein the decision graph is based on sharing structure and parameters among labels.

2. The method of claim 1, where the decision graph is built by iteratively splitting and merging decision nodes or leaf nodes, or both, in the decision graph to increase a measure of purity of outcomes in the leaf nodes.

3. The method of claim 2, wherein the measure of purity comprises a likelihood.

4. The method of claim 1, comprising using the decision graph to predict an occurrence of a specific event or set of events at a specific time given the history up to the specific time.

5. The method of claim 1, wherein the rate parameter of the predicted event comprises a measure a number of events per unit time.

6. The method of claim 1, wherein the question about a predicted event comprises a question about a property of the event label, and wherein the property comprises an identity of the event label, a category of the event label, or an attribute of the event label.

7. The method of claim 1, wherein the question about the historical events comprises a question about an existence or a count of events with a particular property in the historical events in a particular time window relative to a given time, and wherein the particular property comprises an identity of the event label, a category of the event label, or an attribute of the event label.

8. The method of claim 1, wherein the question about both the predicted event and the historical events comprises a question about a property of the event label of a predicted event and an existence or a count of events with a particular property in the historical events in a particular time window relative to a given time.

9. The method of claim 1, wherein the decision graph comprises a decision tree.

10. A system for forecasting a future event in an event stream, wherein the event stream comprises a plurality of events, and wherein each of the plurality of events comprises an event label and an associated time stamp, the system comprising:
    a processor that is adapted to execute stored instructions; and
    a system memory, wherein the system memory comprises code configured to:
        generate one or more decision graphs for predicting events with event labels chosen from a plurality of event labels based on the plurality of events within the event stream, wherein the decision graph comprises decision nodes and leaf nodes, and wherein each of the decision nodes comprises a question and wherein the decision nodes are parents to the leaf nodes, and wherein the decision graph is based on sharing structure and parameters among labels;
        analyze event stream data using the decision graph; and
        forecast a future event in the event stream based on the analysis of the event stream data.

11. The system of claim 10, wherein each of the leaf nodes comprises a rate parameter for a set of predicted events per unit time.

12. The system of claim 11, wherein the question relates to an event label of the future event.

13. The system of claim 10, wherein the question relates to historical events within the event stream that are related to the future event.

14. The system of claim 10, wherein analyzing the event stream data comprises:
    determining a number of decision nodes with questions that are relevant to the future event to be forecast; and
    determining a number of decision nodes with questions that are relevant to a past event that relates to the future event to be forecast.

15. The system of claim 14, wherein forecasting the future event in the event stream comprises predicting the future event based on answers to the decision nodes with the questions that are relevant to the future event and answers to the decision nodes with the questions that are relevant to the past event.

16. The system of claim 15, wherein forecasting the future event comprises determining a leaf node comprising the future event based on the answers.

17. The method of claim 1, a factored structural prior is used in splitting and merging decisions nodes and leaf nodes, wherein:
    a node is split by applying a question to obtain new nodes and a gain in a posterior of a structure due to the split is calculated;
    a pair of nodes are merged to a new state, generating a new state space and a gain in a posterior of a structure due to this merge is calculated; and
    a next structure is chosen by updating a current structure by choosing the best split or merge, until there is no gain.

* * * * *